United States Patent Office 3,399,978
Patented Sept. 3, 1968

3,399,978
PREPARATION OF BORODEUTERIDES
Joseph G. Atkinson and Paul H. Tremaine, Montreal, Quebec, Canada, assignors to Merck, Sharp & Dohme of Canada, Limited, Montreal, Quebec, Canada
No Drawing. Filed July 7, 1965, Ser. No. 470,205
Claims priority, application Canada, May 19, 1965, 931,091
5 Claims. (Cl. 23—363)

ABSTRACT OF THE DISCLOSURE

A method for the preparation of an alkali metal borodeuteride which comprises treating a trialkylamineborane with deuterio-sulfuric acid in deuterium oxide followed by the reaction of the deuterated trialkylamineborane with an alkali metal alkoxide.

---

This invention relates to a process for the preparation of alkali metal borodeuterides.

More particularly, it relates to an improved process for the preparation and recovery in high yield of lithium borodeuteride, sodium borodeuteride, and potassium borodeuteride in a state of high chemical and isotopic purity.

Still more particularly, it relates to a process of converting a trialkylamineborane to the corresponding deuterated borane by treatment with deuteriosulfuric acid and subsequently converting said deuterated borane to alkali metal borodeuteride and recovering pure alkali metal borodeuteride by extraction.

Sodium borohydride and potassium borohydride are known to be extremely effective as selective, relatively mild chemical reducing agents for reducible functional groups in organic molecules. In particular, sodium borohydride or potassium borohydride is effectively employed to reduce isolated carbonyl substituents in molecules containing, for example, ketone and aldehyde groups, without affecting the carboxyl substituents or derivatives thereof. Because sodium borodeuteride behaves similarly to sodium borohydride and potassium borodeuteride behaves similarly to potassium borohydride their use in such reductions provides a useful method for the selective introduction of deuterium into organic compounds. Such deuterated or labelled compounds are useful in biochemical and medical research. Thus, the metabolism of a particular class of compounds can be traced and the ultimate disposition of the deuterium labelled compound determined by methods involving the detection of detection deuterium in labelled molecules. Sodium borodeuteride is sold commercially and reports of its synthesis have been published. However, it is believed that none of the published methods describe a practical method for the preparation of the material in good yield and in the highest state of chemical and isotopic purity.

Lithium borohydride is a selective reducing agent for organic functional groups but is more reactive than sodium borohydride or potassium borohydride and will reduce aldehydes, ketones and ester functions. The use of lithium borodeuteride would permit the selective introduction of deuterium into organic compounds.

In accordance with the present invention, a trialkylamineborane, e.g., trimethylamineborane, is contacted with a solution of deuteriosulfuric acid in deuterium oxide under anhydrous conditions to effect an exchange of deuterium for hydrogens in the borane molecules to produce trimethylamineborane-$d_3$. The deuterated trimethylamineborane is then contacted under anhydrous conditions with an alkali metal alkoxide to produce the metal borodeuteride in good yield and in a reasonably high state of purity. The product produced is further purified by selective extraction with a low molecular weight monoamine or diamine and the purified alkali metal borodeuteride recovered as a residue following removal of the amine solvent by evaporation in vacuo.

The compounds employed as starting materials in the process of our invention are tertiary amine boranes dissolved in a solvent immiscible in water. Trialkylamineboranes have been found to be especially suitable for the purpose in view of their ready availability. Thus, among the compounds useful as starting materials in the process are included trimethylamineborane, triethylamineborane, tri-n-propylamineborane and tri-n-butylamineborane, the trimethylamine compound being preferred.

In carrying out the first step of the process in which the borane hydrogens are exchanged with deuterium, the trialkylamineborane is dissolved in an anhydrous water-immiscible solvent. The solution of trialkylamineborane is intimately contacted for a period of 10–40 hours with a dilute solution of deuteriosulfuric acid in deuterium oxide. The deuterium content of the deuteriosulfuric acid and the deuterium oxide is preferably above 50 atom percent deuterium because the extent of exchange of hydrogen for deuterium in the amineborane increases with increasing deuterium content of the deuteriosulfuric acid and deuterium oxide. The rate of exchange of deuterium for hydrogen increases with increase in temperature. The increased rate of exchange at higher temperatures is unfortunately accomplished at the expense of product yield. Thus, the carrying out of the exchange reaction at higher temperatures tends to decompose the formed product at a greater rate than at the lower temperatures. The exchange reaction is therefore advantageously conducted at a temperature between about 0 and 100° C., and preferably from about 15–30° C.

The exchange reaction, being an equilibrium reaction, effects only a partial replacement of hydrogen by deuterium in one operation. Following the initial exchange, the solution of deuteriosulfuric acid in deuterium oxide is separated and replaced with fresh solution and the exchange reaction described above repeated. The progress of the exchange reaction is followed by observation of the infrared absorption spectrum of the trimethylamineborane material. Thus, initially the trimethylamineborane compound has a strong absorption at a frequency of 2300 cm.$^{-1}$ indicating a B-H bond and, near the end of the exchange reaction, i.e., when substantially all of the hydrogens of the borane are replaced with deuterium, the B-H band almost disappears and an absorption showing the appearance of a strong, broad doublet centered at a frequency of 1740 cm.$^{-1}$ appears, characterstic of the boron deuterium bond. The exchange reaction described above is repeated for a sufficient number of times to effect the disappearance of the boron hydrogen absorption and the appearance of the strong boron deuterium absorption.

In accordance with a preferred embodiment of our process, a trimethylamineborane solution is contacted with a dilute solution of deuteriosulfuric acid for about 24 hours, the used deuteriosulfuric acid is separated from the reaction mixture and then the process is repeated about nine times. The trimethylamineborane-$d_3$ product obtained according to this preferred method of operation is substantially free from any boron hydrogen absorption bands in the infrared spectrum and contains strong boron deuterium bonds indicating approximately 100% isotopic purity.

Following the exchange reaction, the solution containing the trimethylamineborane-$d_3$ product is separated from the deuteriosulfuric acid solution and dried. The solvent is removed by distillation in vacuo leaving the desired amineborane-$d_3$ as a residue.

It is extremely important in carrying out the exchange reaction to exclude water and other substances containing active hydrogens from the reaction flask since any materials containing labile hydrogen will disadvantageously affect the rate of exchange of deuterium for hydrogen. The solvent employed for the aminoborane in the exchange reaction must be relatively inert under the reaction conditions and, preferably, be immiscible with water. Suitable solvents for the reaction are ethers, e.g., ethyl ether, dibutyl ether, diisopropyl ether or mixtures thereof; hydrocarbons such as n-pentane, n-hexane, heptane and octane; and halogenated hydrocarbons, for example, chloroform, carbon tetrachloride, methylene dichloride, dichloroethylene, and the like.

In accordance with the process of our invention, the isolated trimethylaminoborane-$d_3$ is then contacted in an anhydrous solution with an alkali metal alkoxide and heated to a temperature of at least 120° C. until the conversion of trimethylaminoborane-$d_3$ to alkali metal borodeuteride is substantially complete. The reaction is accompanied by the evolution of trimethylamine and, thus, completion of the reaction is indicated by a cessation of the evolution of gas. In order to ensure completion of the reaction, the reaction mixture is slowly heated to a temperature of 120° C. to initiate the reaction and cause evolution of the trimethylamine. Heating of the reaction mixture is then continued until a temperature of 150° C. is attained. The entire reaction mixture is then preferably maintained at a temperature of from 130–150° C. for a period of from 1–10 hours. Alternatively, heating of the reaction mixture is continued for a period of at least one hour after the evolution of gaseous trimethylamine is no longer observed.

In carrying out the second phase of the reaction, the solvent selected is one which has a boiling point of greater than about 150° C. and which is inert under the conditions of the reaction. The solvent thus must contain no labile hydrogen, and, preferably, is a solvent for both the alkali metal alkoxide and the trimethylaminoborane-$d_3$. Ethers of alkylene glycols or dialkylene glycols which have been purified to remove any contaminating peroxides are especially useful, the dimethyl ether of diethylene glycol being preferred. Other suitable solvents include the dimethyl ether of triethylene glycol, the dimethyl ether of tetraethylene glycol, dibutyl ether, cymene and decalin.

The formed alkali metal borodeuteride is then recovered by removal of the reaction solvent by suction filtration or distillation in vacuo, leaving as a residue the crude product which comprises alkali metal borodeuteride at a purity of 75–90%. The impurities consist mainly of unreacted alkali metal alkoxide.

In accordance with a further embodiment of our invention, the isolated product is further purified by selective extraction into ammonia or a low molecular weight mono or diamine. Suitable amines are lower alkyl amines such as ethylamine, methylamine, i-propylamine, n-propylamine, butylamine, sec-butylamine, isobutylamine, t-butylamine, ethylenediamine and the like. N-propylamine is particularly preferred for this purpose. This extraction dissolves the pure alkali metal borodeuteride preferentially leaving the impurities as a residue. The extract of substantially pure alkali metal borodeuteride is distilled in vacuo to remove the solvents and leave as residual material white crystalline alkali metal borodeuteride having a chemical purity of greater than 97% and a deuterium content of approximately 98 atom percent.

The following examples are presented to illustrate the methods of carrying out the present invention.

Example 1.—Trimethylaminoborane-$d_3$

An ethereal solution of trimethylaminoborane is prepared by mixing 400 g. of commercially available trimethylaminoborane in 4 liters of dry ether and filtering through glass wool to remove extraneous insoluble impurities. The resulting solution is stirred vigorously for 24 hours at room temperature with 500 ml. of 0.5 N deuteriosulfuric acid in deuterium oxide. The stirring is then stopped and the deuterium oxide layer drawn off and replaced with an additional 500 ml. of 0.5 N deuteriosulfuric acid in deuterium oxide. The solutions are vigorously stirred for a period of 24 hours. The treatment of trimethylaminoborane in ether with 500 ml. of 0.5 N deuteriosulfuric acid in deuterium oxide is repeated until a total of ten 500 ml. portions of deuterium oxide are used. The deuterium oxide used in the later exchanges has a deuterium content of 99.7 atom percent. Following the final treatment, the ethereal solution is washed once with 200 ml. of deuterium oxide of 99.7 atom percent deuterium content. The ethereal solution containing deuterated trimethylaminoborane is then dried over anhydrous sodium carbonate and the ethereal solution is evaporated under reduced pressure to leave as a residue 240 grams of substantially pure trimethylaminoborane-$d_3$ in crystalline form having a melting point of 94–95° C. (undepressed on admixture with the starting material). The material produced in this manner, when dissolved in tetrachlorethylene has an infrared absorption spectrum characterized by the presence of a strong broad doublet absorption at 1740 cm.$^{-1}$ and substantially zero absorption at 2300 cm.$^{-1}$. These bands are characteristic of B–D and B–H bonds, respectively, and the spectrum thus indicates substantially complete exchange of hydrogen by deuterium.

Example 2.—Sodium borodeuteride

A mixture of 122 grams (1.61 moles) of trimethylaminoborane-$d_3$, 65 grams (1.20 moles) of alcohol-free sodium methoxide and 400 ml. of diethylene glycol diethyl ether (which is redistilled under reduced pressure from sodium borodeuteride to remove any oxidizing impurities) is stirred under an atmosphere of dry nitrogen in an oil bath while gradually increasing the temperature of the oil bath from 70° to 150° over a period of 30 minutes during which time trimethylamine evolves from the reaction mixture as a gas and the product, sodium borodeuteride, is formed. The evolved trimethylamine is trapped in aqueous hydrochloric acid. The bath temperature is maintained at 150° C. until the evolution of the gaseous trimethylamine stops (about 4 hours). The formed sodium borodeuteride separates from solution as a solid and is recovered by filtration from the hot (>100° C.) reaction mixture and dried under reduced pressure to yield 51 grams of a crude white powder. Analysis of this material shows that it has a chemical purity of approximately 88% as determined by the volume of gas evolved on hydrolysis with acid.

The crude white solid is stirred with 500 ml. n-propylamine (redistilled from calcium hydride) for a period of approximately 30 minutes to dissolve sodium borodeuteride from the impurity material. The solution of sodium borodeuteride in n-propylamine is separated from the solid impurity by centrifugation and substantially pure sodium borodeuteride is recovered as a residue after distillation of the bulk of the n-propylamine at atmospheric pressure followed by removal of the residual amine under vacuum (1 mm.) at steam bath temperatures. The yield was 37 grams (0.88 mole) of sodium borodeuteride of 97% chemical purity. Isotopic content equals at least 98% deuterium. The isotopic purity of the sodium borodeuteride product is determined by reduction of a ketone containing no alpha-hydrogens with the sodium borodeuteride and determination of the residual hydrogen in the alcohol by nuclear magnetic resonance spectroscopy. Alternatively, a sample may be hydrolyzed wtih deuteriophosphoric acid in deuterium oxide, and the deuterium gas which is evolved may be analyzed by mass spectrometry.

Example 3.—Potassium borodeuteride

A mixture of 11.7 grams (160 mmoles) of trimethylaminoborane-$d_3$, 8.4 grams (120 mmoles) of potassium methoxide and 40 ml. of diethylene glycol diethyl ether is stirred in a 200 ml. 3-necked flask under an atmosphere of dry nitrogen. The flask is immersed in an oil bath at 70° C. and the temperature is raised to 120° over a period of 30 minutes. Trimethylamine, which begins evolving at a bath temperature of 110°, is trapped in aqueous hydrochloric acid. The reaction is swept with a slow stream of nitrogen to completely remove trimethylamine. The reaction is complete after 4 hours at 120°.

The reaction mixture is filtered hot and the filter cake pumped dry under high vacuum at 100° for 1.5 hours to yield 6.62 grams (85% yield) of potassium borodeuteride with a purity of 89%. This crude material is stirred with ethylenediamine (40 ml. per gram of crude potassium borodeuteride) for 15 minutes at 25°, the mixture centrifuged and the supernatant liquid (containing the potassium borodeuteride) separated and taken to dryness to yield 5.0 grams (86 mmoles, 72%) of potassium borodeuteride with a purity of 94%.

Various changes and modifications of the invention can be made, and to the extent that such variations incorporate the spirit of this invention, they are intended to be included within the scope of the appended claims.

We claim:

1. The process for preparing an alkali metal borodeuteride which comprises intimately contacting a trialkylamineborane with a solution of deuteriosulfuric acid in deuterium oxide to produce a trialkylamineborane compound wherein at least a portion of the hydrogen of said borane is replaced with deuterium, heating the resulting deuterated trialkylamineborane in intimate contact with an alkali metal alkoxide to produce an alkali metal borodeuteride as a crude solid, contacting said alkali metal borodeuteride with a low molecular weight amine to selectively dissolve pure alkali metal boro deuteride from the crude solid mixture, separating the resulting solution of substantially pure alkali metal borodeuteride and recovering alkali metal borodeuteride from said solution in substantially pure solid form.

2. The process which comprises intimately mixing a solution of trimethylamineborane in ether with a dilute solution of deuteriosulfuric acid in deuterium oxide to produce a deuterated trimethylamineborane, recovering said trimethylamineborane as a white crystalline solid and heating said borane in intimate contact with an alkali metal methoxide in the dimethyl ether of diethylene glycol to a temperature of at least 120° C. to produce an alkali metal borodeuteride as a crude solid, extracting said crude solid with a minimum amount of a low molecular weight amine, thereby selectively dissolving substantially pure alkali metal borodeuteride from said crude solid and recovering alkali metal borodeuteride in substantially pure form.

3. The process which comprises intimately mixing a solution of trimethylamineborane in ether with a dilute solution of deuteriosulfuric acid in deuterium oxide of greater than 50% deuterium content for a period of from 1 to 40 hours at a temperature of 0–35° C. to convert at least a portion of trimethylamineborane to the corresponding deuterated compound, separating the resulting spent deuteriosulfuric acid-deuterium oxide solution from said ether solution and successively repeating the steps of intimately mixing the ether solution with a dilute solution of deuteriosulfuric acid in deuterium oxide followed by separation of said deuterium oxide solution until the solid material dissolved in said ether solution exhibits an infrared spectrum characterized by a strong, broad doublet absorption at 1740 cm.$^{-1}$ and substantially zero absorption at 2300 cm.$^{-1}$, drying and evaporating the resulting ether solution of trimethylamineborane-$d_3$ to produce trimethylamineborane-$d_3$ as a white crystalline solid having a M.P. of 94–95° C., heating said white crystalline solid with lithium methoxide in diethylene glycol dimethyl ether to a temperature of from 120–150° C. to produce lithium borodeuteride as a crude solid material, recovering said crude solid and extracting said crude solid with from 5 to 20 ml. of n-propylamine per gram of crude solid to form a solution of substantially pure lithium borodeuteride in n-propylamine and recovering lithium borodeuteride as a solid residue from said solution by evaporation of the n-propylamine under reduced pressure.

4. The process which comprises intimately mixing a solution of trimethylamineborane in ether with a dilute solution of deuteriosulfuric acid in deuterium oxide of greater than 50% deuterium content for a period of from 1 to 40 hours to convert at least a portion of trimethylamineborane to the corresponding deuterated compound, separating the resulting spent deuteriosulfuric acid-deuterium oxide solution from said ether solution and successively repeating the steps of intimately mixing the ether solution with a dilute solution of deuteriosulfuric acid in deuterium oxide followed by separation of said deuterium oxide solution until the solid material dissolved in said ether solution exhibits an infrared spectrum characterized by a strong, broad doublet absorption at 1740 cm.$^{-1}$ and substantially zero absorption at 2300 cm.$^{-1}$, drying and evaporating the resulting ether solution of trimethylamineborane-$d_3$ to produce trimethylamineborane-$d_3$ as a white crystalline solid having a M.P. of 94–95° C., heating said white crystalline solid with sodium methoxide in diethylene glycol dimethyl ether to a temperature of from 120–150° C. to produce sodium borodeuteride as a crude solid material, recovering said crude solid and extracting said crude solid with from 5 to 20 ml. of n-propylamine per gram of crude solid to form a solution of substantially pure sodium borodeuteride in n-propylamine and recovering sodium borodeuteride as a solid residue from said solution by evaporation of the n-propylamine under reduced pressure.

5. The process which comprises intimately mixing a solution of trimethylamineborne in ether with a dilute solution of deuteriosulfuric acid in deuterium oxide of greater than 50% deuterium content for a period of from 1 to 40 hours at a temperature of 0–35° C. to convert at least a portion of trimethylamineborane to the corresponding deuterated compound, separating the resulting spent deuteriosulfuric acid-deuterium oxide solution from said ether solution and successively repeating the steps of intimately mixing the ether solution with a dilute solution of deuteriosulfuric acid in deuterium oxide followed by separation of said deuterium oxide solution until the solid material dissolved in said ether solution exhibits an infrared spectrum characterized by a strong, broad doublet absorption at 1740 cm.$^{-1}$ and substantially zero absorption at 2300 cm.$^{-1}$ indicating substantially complete replacement of the boron hydrogens by deuterium, drying and evaporating the resulting ether solution of trimethylamineborane-$d_3$ to produce trimethylamineborane-$d_3$ as a white crystalline solid having a M.P. of 94–95° C., heating said white crystalline solid with potassium methoxide in diethylene glycol dimethyl ether to a temperature of from 120–150° C. to produce potassium borodeuteride as a crude solid material, recovering said crude solid and extracting said crude solid with from 5 to 20 ml. of ethylenediamine per gram of crude solid to form a solution of substantially pure potassium borodeuteride in ethylenediamine and recovering potassium borodeuteride as a solid residue from said solution by evaporation of the ethylenediamine under reduced pressure.

No references cited.

OSCAR R. VERTIZ, *Primary Examiner.*

G. PETERS, *Assistant Examiner.*